United States Patent Office 2,880,205
Patented Mar. 31, 1959

2,880,205

**6-FLUORO-9α-HALO-11-OXYGENATED-4-PREG-
NENES AND 6-FLUORO-9α-HALO-11-OXY-
GENATED-1,4-PREGNADIENES**

J Allan Campbell, Kalamazoo Township, Kalamazoo
County, John C. Babcock, Portage Township, Kalamazoo County, and John A. Hogg, Kalamazoo Township, Kalamazoo County, Mich., assignors to The Upjohn Company, Kalamazoo, Mich., a corporation of Michigan No Drawing. Application June 9, 1958
Serial No. 740,535

25 Claims. (Cl. 260—239.55)

The present invention relates to novel 6α-fluoro and 6β-fluoro steroid compounds and is more particularly concerned with certain 6-fluoro-9α-halo-11-oxygenated-4-pregnene-3,20-diones and the Δ¹-analogues thereof, for example, 6 - fluoro - 9α - halo - 11β - hydroxy - 4 - pregnene - 3,20 - diones (6 - fluoro - 9α - halo - 11β - hydroxyprogesterones), 6 - fluoro - 9α - halo - 4 - pregnene - 3,11, 20 - triones (6 - fluoro - 9α - halo - 11 - ketoprogesterones), 6 - fluoro - 9α - halo - 11β - hydroxy - 1,4 - pregnadiene - 3,20 - diones (1 - dehydro - 6 - fluoro - 9α - halo - 11β - hydroxyprogesterones), 6 - fluoro - 9α - halo - 1,4 - pregnadiene - 3,11,20 - triones (1 - dehydro - 6 - fluoro - 9α - halo - 11 - ketoprogesterones) and novel 6-fluoro steroid intermediates and methods used in the production thereof.

The novel products of this invention include those represented by the formula:

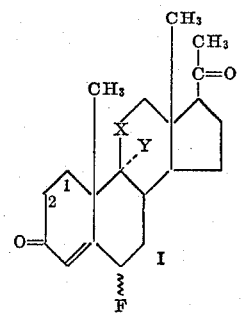

wherein the 1,2-carbon atom linkage is selected from the linkages consisting of single bond and double bond linkages, X is selected from the group consisting of the carbonyl radical (>C=O) and the hydroxymethylene radical (>CHOH) and Y is a halogen having an atomic weight of from nineteen to eighty, inclusive.

In this application the wavy line (⌇) when appearing at the 6-position is a generic expression inclusive of the alpha (α) and beta (β) configuration.

It is an object of the present invention to provide novel 6 - fluoro - 9α - halo - 11 - oxygenated - 4 - pregnene - 3, 20-diones and the Δ¹-analogues thereof, for example, 6-fluoro - 9α - halo - 11β - hydroxy - 4 - pregnene - 3,20-diones, 6 - fluoro - 9α - halo - 4 - pregnene - 3,11,20-triones, 6 - fluoro - 9α - halo - 11β - hydroxy - 1,4 - pregnadiene - 3,20 - diones, 6 - fluoro - 9α - halo - 1,4 - pregnadiene - 3,11,20 - triones and novel 6-fluoro steroid intermediates and methods in the production thereof. Other objects will be apparent to those skilled in the art to which this invention pertains.

The compounds of Formula I possess useful therapeutic properties. They possess glucocorticoid and antiinflammatory activities and are useful in the treatment of inflammatory conditions of the skin, eyes and ears of humans and of valuable domestic animals, as well as contact dermatitis and other allergic reactions. In addition, they affect the secretion of gonadotropins and thus regulate ovulation and endometrial and placental development and particularly when used in conjunction with estrogens, e.g., ethinyl-estradiol, and/or androgens, e.g., 9α - fluoro - 11β - hydroxy - 17 - methyltestosterone, reduce fertility and constitute effective therapy for dysmenorrhea, amenorrhea, endometriosis, threatened abortion and related gynecological disorders.

Compositions containing the compounds of the present invention can be prepared for human or animal use by incorporating them in any one of the several dosage forms suitable for such use. Administration of the novel steroids thus can be in conventional dosage forms, such as pills, tablets, capsules, solutions, syrups or elixirs for oral use, or in liquid forms which are adaptable to the natural and synthetic cortical steroid hormones for injectable products.

The novel compounds can also be administered topically in the form of ointments, creams, lotions, and the like, with or without coacting antibiotics, germicides, or other materials forming advantageous combinations therewith.

The starting steroids for the processes of the present invention, for example, 6α - fluoro - 11β - hydroxy - 4-pregnene - 3,20 - dione, 6β - fluoro - 11β - hydroxy - 4-pregnene - 3,20 - dione, 6α - fluoro - 11α - hydroxy - 4-pregnene - 3,20 - dione, and 6β - fluoro - 11α - hydroxy-4 - pregnene - 3,20 - dione, are disclosed in our copending application Serial No. 699,503, filed November 29, 1957, now Patent No. 2,838,501 issued June 10, 1958.

The novel compounds of the present invention can be prepared in accordance with the following reaction scheme:

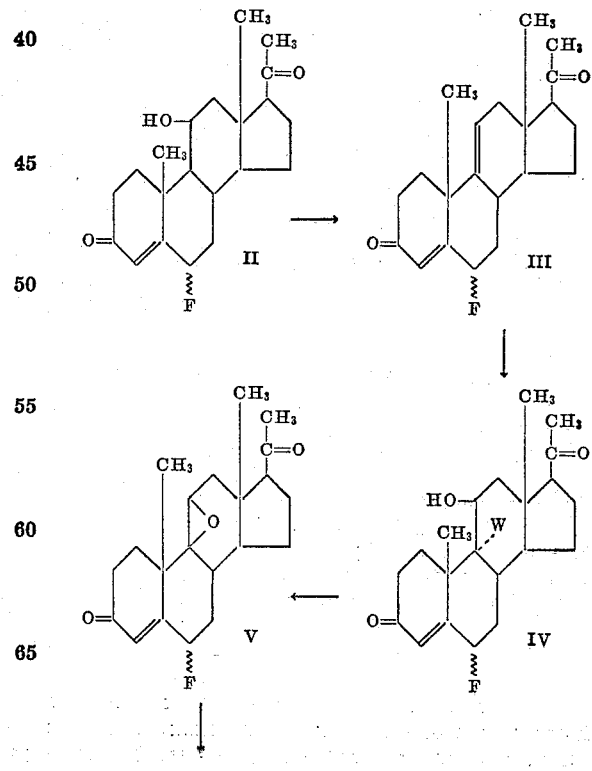

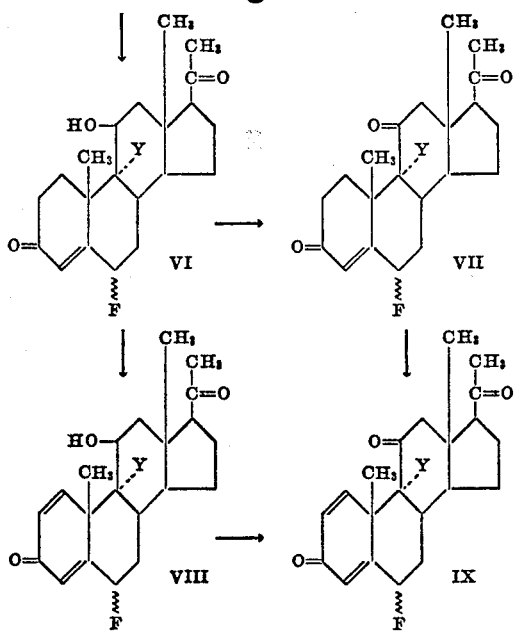

wherein Y has the same meaning as previously given and W is a halogen having an atomic weight of from 35 to 127, inclusive.

One of the novel processes of this invention, depicted schematically above, comprises first the dehydration of 6-fluoro-11β-hydroxy-4-pregnene-3,20-dione or 6-fluoro-11α-hydroxy-4-pregnene-3,20-dione to obtain 6-fluoro-4,9(11)-pregnadiene-3,20-dione followed by treatment of the dehydration product with a source of hypohalous acid in which the halogen is bromine, chlorine, or iodine to produce the corresponding 6-fluoro-9α-halo-11β-hydroxy-4-pregnene-3,20-dione. The said 9α-halo compound is then dehydrohalogenated with a mild base to give 6-fluoro-9,11β-oxido-4-pregnene-3,20-dione. Cleavage of the said 9,11-oxido compound with a hydrogen halide or a hydrogen halide releasing agent, which provides a source of hydrogen fluoride, hydrogen chloride, or hydrogen bromide, gives the corresponding 6-fluoro-9α-halo-11β-hydroxy-4-pregnene-3,20-dione which can be oxidized by known methods to produce 6-fluoro-9α-halo-4-pregnene-3,11,20-trione.

6 - fluoro - 9α - halo - 11β - hydroxy - 4 - pregnene-3,20-dione and 6-fluoro-9α-halo-4-pregnene-3,11,20-trione can then be subjected to biological dehydrogenation using microorganisms, for example, a species of the genus Septomyxa, or to chemical dehydrogenation using selenium dioxide according to methods known in the art to produce the corresponding Δ¹-analogues thereof; namely, 6 - fluoro - 9α - halo - 11β - hydroxy - 1,4 - pregnadiene-3,20-dione and 6-fluoro-9α-halo-1,4-pregnadiene-3,11,20-trione, respectively.

Alternatively, 6-fluoro-9α-halo-1,4-pregnadiene-3,11,20-trione can be obtained from 6-fluoro-9α-halo-11β-hydroxy-1,4-pregnadiene-3,20-dione by oxidation using methods known to convert hydrocortisone to cortisone.

In carrying out one of the novel processes of this invention, 6-fluoro-11β-hydroxy-4-pregnene-3,20-dione (II), or the 11α-hydroxy analogue thereof, is dehydrated to 6-fluoro-4,9(11)-pregnadiene-3,20-dione (III) by methods known in the art, e.g., by a dehydrating agent such as phosphorous oxychloride, thionyl chloride, hydrochloric acid or sulfuric acid and acetic acid, or the dehydration can be effected by the preferred method of reacting the 6-fluoro-11β-hydroxy-4-pregnene-3,20-dione (II) with a carboxylic acid N-haloamide or N-haloimide, wherein the halogen is bromine or chlorine, in an organic base either with or followed by anhydrous sulfur dioxide. Examples of such N-haloamides or N-haloimides are N-chloroacetamide, N-bromoacetamide, N-chlorosuccinimide, N-bromosuccinimide, 3-bromo-5,5-dimethylhydantoin, 1,3-dibromo-5,5-dimethylhydantoin, and the like, N-bromoacetamide being preferred. The organic bases employed as solvents in the above reaction are generally tertiary amines wherein the amino nitrogen is a member of an aromatic ring, such as the pyridines and lower fatty amides, pyridine being preferred. Normally an amount in excess of a molar equivalent of organic base calculated on the basis of the quantity of starting steroid is employed. The sulfur dioxide is advantageously employed in substantially anhydrous form, inasmuch as the presence of water tends to decrease the yield of dehydrated product. The temperature of the reaction is generally between minus forty and plus seventy degrees centigrade, the lower limit being determined by the solubility of the substituents in the solvent selected and the upper limit by the amount of side reaction which normally accompanies reactions involving halogen compounds at higher temperatures. Ordinarily, room temperatures are preferred for convenience and because of the consistently high yields of end product which are obtained. A reaction time between about five minutes and three hours is usually employed, the specific temperature at which the reaction is conducted being determinative of the reaction time.

The thus-obtained dehydration product is converted to 6 - fluoro - 9α - halo - 11β - hydroxy - 4 - pregnene - 3,20-dione (IV) by reaction with a hypohalous acid. The hypohalous acid is usually produced in situ by reaction of an acid with N-haloamide or N-haloimide wherein the halogen is bromine, chlorine or iodine. The 6-fluoro-4,9(11)-pregnadiene-3,20-dione (III) is dissolved in an organic solvent such as methylene chloride, tertiary butyl alcohol, dioxane, tertiary amyl alcohol or the like, and reacted at room temperature with the hypohalous acid releasing agent, which includes N-bromoacetamide, N-chloroacetamide, N-bromosuccinimide, N-iodosuccinimide, N-chlorosuccinimide, and the like, in the presence of an acid such as perchloric acid, dilute sulfuric acid, and the like. N-bromoacetamide in tertiary butyl alcohol with perchloric acid and water are the preferred reagents for this reaction. Normally the halogenation is conducted at room temperatures, between fifteen and thirty degrees centigrade, although temperatures on either side of this range are operative. The reaction period may vary from about five minutes to one hour. At the conclusion of the desired reaction, the excess hypohalous acid is destroyed by the addition of sulfites or hydrosulfites, sodium sulfite being normally employed. The resulting 6-fluoro-9α-halo-11β-hydroxy-4-pregnene-3,20-dione (IV), in which the halogen is bromine, chlorine, or iodine, can be isolated from the reaction mixture by adding an excess of water and extracting the product with organic solvents or by recovering the precipitated compound by filtration. The crude reaction product may be employed directly in the next step of the process.

The 9α-halo compound (IV) as defined above is then dehydrohalogenated with a weak base, potassium acetate being preferred, to convert it into the corresponding 9,11β-oxido compound. The reaction is conducted in an inert solvent such as methanol, ethanol, acetone, dioxane, and the like. The dehydrohalogenation reaction takes place over a rather wide range of temperatures, normally from about minus fifteen degrees to the boiling point of the reaction mixture, the range between zero degrees and sixty degrees centigrade being most convenient. The reaction time may be varied considerably, depending on the weak base, solvent and the temperature employed. When potassium acetate is used, a period of reflux of from about one to twenty hours produces satisfactory yields, with about eighteen hours usually being sufficient. The reaction mixture is concentrated, cooled and precipitated with water to give 6-fluoro-9,11β-oxido-4-pregnene-3,20-dione (V).

In the epoxide opening step, the 9,11β-oxido compound (V) is reacted with a hydrogen halide such as hydrogen fluoride, hydrogen chloride, or hydrogen bromide to produce the corresponding 6-fluoro-9α-halo-11β-hydroxy-4-pregnene-3,20-dione (VI). Advantageously, the steroid is first dissolved in an organic solvent such as tetrahydrofuran, methylene chloride, and the like. The epoxide cleavage with hydrogen halide is usually conducted at temperatures between about minus eighty and plus fifty degrees centigrade, the preferred limits being between about minus ten and plus 25 degrees centigrade. The reaction time is usually from about one to 24 hours, with one to five hours being required at room temperatures. After the reaction is complete, the mixture is poured into water and neutralized with a dilute base, such as dilute sodium or potassium hydroxide, or a bicarbonate such as sodium bicarbonate, potassium bicarbonate, or the like. The reaction mixture is then extracted in the usual manner, such as with methylene chloride, and the 6-fluoro-9α-halo-11β-hydroxy-4-pregnene-3,20-dione (VI) recovered in a purified form by recrystallization or chromatography.

6-fluoro-9α-halo-11β - hydroxy-4-pregnene - 3,20 - dione (VI) can then be treated with an oxidizing agent, for example, chromium trioxide, potassium dichromate or sodium dichromate, to obtain 6-fluoro-9α-halo-4-pregnene-3,11,20-trione (VII). The oxidation can be carried out by a variety of methods, such as for example, by oxidizing 6-fluoro-9α-halo-11β-hydroxy-4-pregnene-3,20-dione (VI) in acetic acid solution with chromium trioxide or sodium dichromate, or by oxidizing with chromium trioxide in the presence of pyridine. As the conclusion of the desired oxidation reaction, the excess chromic acid is generally destroyed by the addition of methyl alcohol, ethyl alcohol, and the like. Thereafter, the resulting 6-fluoro-9α-halo-4-pregnene-3,11,20-trione (VII) is recovered by conventional means, for example, by precipitation with water, or extraction with water-immiscible solvents, e.g., methylene chloride, ether, benzene, toluene, or the like, and purified by crystallization or by chromatography.

6-fluoro-9α-halo-11β - hydroxy-4-pregnene - 3,20 - dione (VI) and 6-fluoro-9α-halo-4 - pregnene - 3,11,20 - trione (VII) are converted to the Δ¹-analogues thereof, 6-fluoro-9α-halo-11β-hydroxy-1,4-pregnadiene - 3,20-dione (VIII) and 6-fluoro-9α-halo-1,4-pregnadiene-3,11,20-trione (IX), respectively, using either fermentative or chemical dehydrogenation. Microorganisms such as Septomyxa, Corynebacterium, Fusarium, and the like, are used under fermentation conditions well known in the art (e.g., U.S. Patent 2,602,769) and illustrated in greater detail below. The chemical dehydrogenation can be carried out with selenium dioxide using procedures well known in the art and further illustrated by the examples herein.

Alternatively, 6-fluoro-9α-halo-1,4-pregnadiene-3,11,20-trione (IX) is obtained by the oxidation of 6-fluoro-9α-halo-11β-hydroxy-1,4-pregnadiene-3,20-dione (VIII), using the same procedures, described above and in greater detail below, for the oxidation of 6-fluoro-9α-halo-11β-hydroxy-4-pregnene-3,20-dione (VI) to 6-fluoro-9α-halo-4-pregnene-3,11,20-trione (VII).

The Δ¹,⁴-compounds of the instant invention are represented by the following formula:

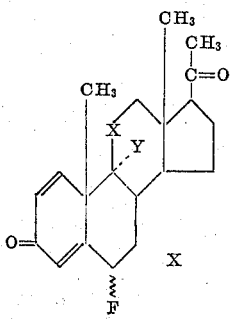

wherein X and Y have the same meaning as previously given.

A process for the preparation of these compounds is represented by the following reaction scheme:

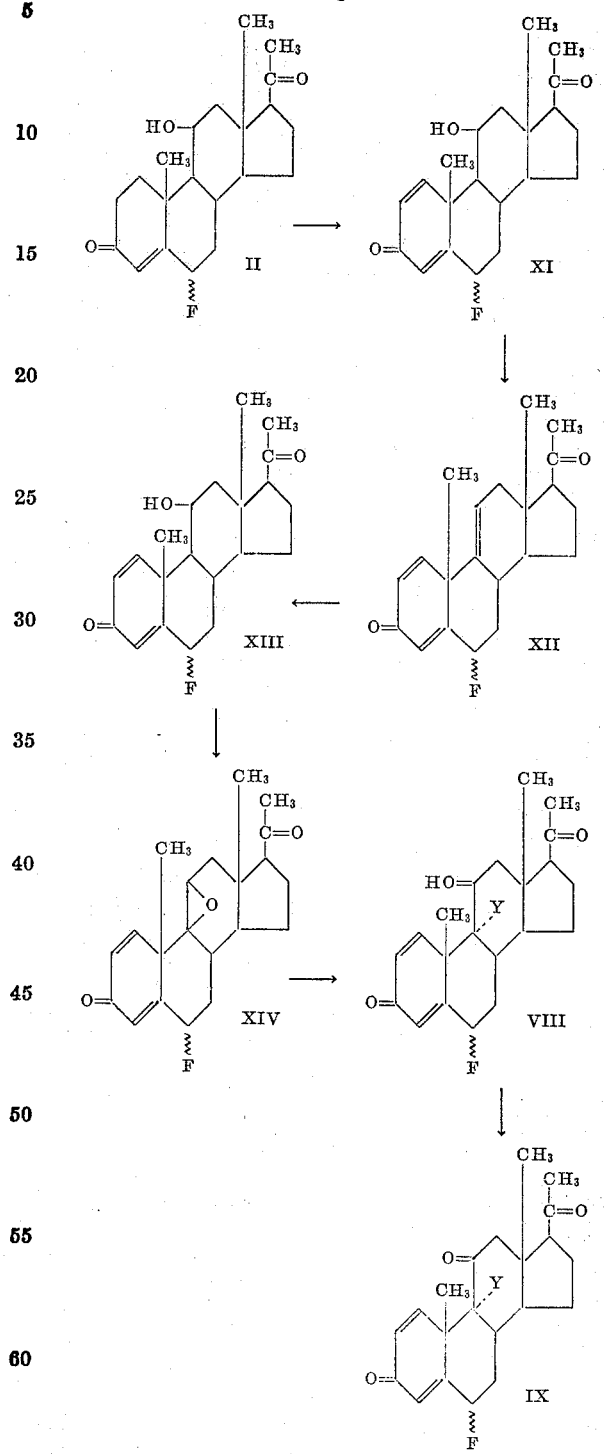

wherein W and Y have the same meaning as previously given.

The alternative process for the preparation of the Δ¹,⁴-steroid compounds of the instant invention comprises: the dehydrogenation of 6-fluoro-11β-hydroxy-4-pregnene-3,20-dione (II) or 6-fluoro-11α-hydroxy-4-pregnene-3,20-dione to produce 6-fluoro-11β-hydroxy-1,4-pregnadiene-3,20-dione (XI) or 6-fluoro-11α-hydroxy-1,4-pregnadiene-3,20-dione, respectively, following the procedures used to convert the 9α-halo-11β-hydroxy steroid (VI) to the Δ¹,⁴-9α-halo-11β-hydroxy steroid (VIII). The thus-obtained Δ$^{1,4}$-11-hydroxy steroid (XI) is then dehydrated to yield 6-fluoro-1,4,9(11)-pregnatriene-3,20-dione (XII) in the same manner that is used to dehydrate the 11-hydroxy steroid starting compound (II) to the Δ$^{9(11)}$-steroid (III). The thus-obtained Δ$^{1,4,9(11)}$-steroid (XII) is then treated with a source of hypohalous acid to convert it to 6-fluoro-9α-halo-11β-hydroxy-1,4-pregnadiene-3,20-dione (XIII) in the same manner that is used to convert the Δ$^{9(11)}$-steroid (III) to the 9α-halo-11β-hydroxy steroid (IV). The thus-obtained Δ$^{1,4}$-9α-halo-11β-hydroxy steroid (XIII) is then dehydrohalogenated to convert it to 6-fluoro-9,11β-oxido-1,4-pregnadiene-3,20-dione (XIV) in the same manner that is used to convert the 9α-halo-11β-hydroxy steroid (IV) to the 9,11β-oxido steroid (V). The thus-obtained Δ$^{1,4}$-9,11β-oxido steroid (XIV) is treated with a hydrogen halide or a hydrogen halide-releasing agent to convert it to 6-fluoro-9α-halo-11β-hydroxy-1,4-pregnadiene-3,20-dione (VIII) in the same manner that is used to convert the 9,11β-oxido steroid (V) to the 9α-halo-11β-hydroxy steroid (VI). The thus-obtained Δ$^{1,4}$-9α-halo-11β-hydroxy steroid (VIII) is then oxidized to convert it to 6-fluoro-9α-halo-1,4-pregnadiene-3,11,20-trione (IX) in the same manner that is used to convert the 9α-halo-11β-hydroxy steroid (VI) to the 9α-halo-11-keto steroid (VII).

The foregoing compounds, I through XIV are all characterized by the presence of a 6-fluoro substituent. It should be noted that the configuration of the fluorine at the 6-position can be either 6α or 6β. Thus, substituting 6β-fluoro-11-hydroxy-4-pregnene-3,20-dione as the starting steroid and following the procedures hereinbefore described and as exemplified below, produces as the final product of each example the corresponding 6β-epimer. Where the 6β-epimer or a mixture predominating therein is employed as the starting material, any subsequent reaction product can be isolated either as the 6β-epimer or as a mixture of 6α- and 6β-epimers from which the components can be separated by chromatography or crystallization. Alternatively, a 6α-epimerized product can be obtained by treatment of the 6β-epimer or mixtures of the 6α- and 6β-epimers at temperatures near zero degrees centigrade, or slightly higher or lower temperatures, in an organic solvent, such as chloroform, methylene chloride, ether, and the like, and in the presence of a protoropic agent (proton-donating reagent) such as alcohols, organic acids, and the like, with a hydrogen halide such as gaseous hydrogen chloride. The mixture should preferably be maintained at temperatures below zero degrees centigrade during the addition of the hydrogen halide. The reaction mixture can then be washed with successive portions of dilute alkali and water, and then dried and evaporated under reduced pressure. The 6α-fluoro products can be recovered from the crude reaction product and purified by recrystallization.

Alternatively, epimerization of the 6β,9α-difluoro steroids can be accomplished with alkali. Bases, for example, solutions of sodium hydroxide and potassium hydroxide, may be used to treat the 6β-epimer in solution in an organic solvent, such as methanol, to produce the 6α-epimer.

As indicated above and described in greater detail below, the sequence of reactions embodied in the processes characterizing this invention is susceptible of variation, the precise order selected being determined by such factors as economics and convenience.

The following examples are illustrative of the process and products of the present invention, but are not to be construed as limiting.

EXAMPLE 1

6α-fluoro-4,9(11)-pregnadiene-3,20-dione (III)

To a solution of one gram of 6α-fluoro-11β-hydroxy-4-pregnene-3,20-dione (II) in ten milliliters of pyridine there is added 0.4 gram of N-bromoacetamide. The mixture is allowed to stand under nitrogen for about twenty minutes, at which time it is cooled to approximately five degrees centigrade. While stirring, anhydrous sulfur dioxide is passed over the surface until the solution gives no color change with acidified starch-iodide paper. The temperature of the reaction mixture is not allowed to go above approximately twenty degrees centigrade during the sulfur dioxide addition. The mixture is then allowed to stand for about five minutes and is poured into 100 milliliters of ice-water, which results in the precipitation of a crude solid. Crystallization from acetone gives 6α-fluoro-4,9(11)-pregnadiene-3,20-dione (III), a crystalline solid.

Similarly, the substitution of 6α-fluoro-11α-hydroxy-4-pregnene-3,20-dione for its 11β-analogue is productive of 6α-fluoro-4,9(11)-pregnadiene-3,20-dione.

EXAMPLE 2

6α-fluoro-9α-bromo-11β-hydroxy-4-pregnene-3,20-dione (IV)

To a solution of 420 milligrams of 6α-fluoro-4,9(11)-pregnadiene-3,20-dione (III) in 6.5 milliliters of methylene chloride there is added 12.5 milliliters of tertiary butyl alcohol, a solution of one milliliter of 72 percent perchloric acid in 7.5 milliliters of water, and a solution of 182 milligrams of N-bromoacetamide in 3.2 milliliters of tertiary butyl alcohol. After stirring for about fifteen minutes, a solution of 182 milligrams of sodium sulfite in ten milliliters of water is added and the mixture concentrated under reduced pressure at approximately sixty degrees centigrade until crystallization occurs. After cooling in an ice bath, thirty milliliters of water is added with stirring. The crystalline product is filtered, washed with water and dried, yielding crystals of 6α-fluoro-9α-bromo-11β-hydroxy-4-pregnene-3,20-dione (IV) having a melting point of 173–175° C. with decomposition. (The product was used in the succeeding example without further purification.)

Substitution of another N-haloamide or an N-haloimide such as N-iodosuccinimide or N-chlorosuccinimide for the N-bromoacetamide in the foregoing reaction is productive of the corresponding 9α-halo product.

EXAMPLE 3

6α-fluoro-9,11β-oxido-4-pregnene-3,20-dione (V)

A mixture of 2.816 grams of 6α-fluoro-9α-bromo-11β-hydroxy-4-pregnene-3,20-dione (IV), 2.816 grams of potassium acetate, and ninety milliliters of acetone is stirred and heated at about reflux temperature for approximately eighteen hours. The reaction mixture is then concentrated to about one-half the original volume and cooled in an ice bath. Addition of 250 milliliters of water yields 6α-fluoro-9,11β-oxido-4-pregnene-3,20-dione (V), a crystalline solid, which is recovered by filtration.

Similarly, 6α-fluoro-9α-chloro-11β-hydroxy-4-pregnene-3,20-dione or the 9α-iodo analogue thereof can be converted to 6α-fluoro-9β,11β-oxido-4-pregnene-3,20-dione.

EXAMPLE 4

6α,9α-difluoro-11β-hydroxy-4-pregnene-3,20-dione (VI)

To 3.41 grams of liquid hydrogen fluoride and twenty milliliters of methylene chloride cooled in Dry-Ice bath there is added, portion-wise, a slurry of 1.875 grams of 6α-fluoro-9β,11β-oxido-4-pregnene-3,20-dione (V) in 5.97 grams of tetrahydrofuran (distilled over sodium hydroxide) and twenty milliliters of methylene chloride which had similarly been cooled in a Dry-Ice bath. After standing at approximately zero to five degrees centigrade for about seventeen hours, the reaction mixture is poured slowly into a stirred mixture of 300 milliliters of ice-water, fifty milliliters of methylene chloride, and twenty grams of sodium bicarbonate. The mixture is stirred for a few minutes, the methylene chloride layer is separated and the water phase extracted with two fifty-milliliter portions of fresh methylene chloride. The combined methylene chloride solutions are washed with water, dried, and chromatographed on a column containing 100 grams of Florisil (synthetic magnesium silicate). The column is eluted with increasing proportions of acetone in Skellysolve B hexanes (100 milliliters per fraction). Those crystalline materials obtained after evaporation of the solvent from the fractions obtained with fifteen to 25 percent acetone in Skellysolve B hexanes are combined and recrystallized from acetone-Skellysolve B hexanes to give substantially pure crystals of 6α,9α-difluoro-11β-hydroxy-4-pregnene-3,20-dione (VI) having a melting point of 249–254° C. with decomposition.

Substitution of aqueous hydrogen chloride or hydrogen bromide for the hydrogen fluoride above is productive of the corresponding 9α-halo product.

EXAMPLE 5

6α,9α-difluoro-4-pregnene-3,11,20-trione (VII)

A solution is prepared containing 0.5 gram of 6α,9α-difluoro-11β-hydroxy-4-pregnene-3,20-dione (VI), 0.35 gram of chromium trioxide, ten milliliters of glacial acetic acid and one-half milliliter of water. This mixture is stirred and maintained at room temperature for approximately eight hours, after which the reaction is terminated by addition of methanol. Thereafter, the mixture is poured into fifty milliliters of ice water and the thus-obtained precipitate collected on a filter and recrystallized three times from ethyl acetate and Skellysolve B hexanes to give 6α,9α-difluoro-4-pregnene-3,11,20-trione (VII), a crystalline solid.

Substitution of the corresponding 9α-chloro or 9α-bromo starting steroid in the above reaction produces 6α-fluoro-9α-chloro-4-pregnene-3,11,20-trione and its 9α-bromo analogue, respectively.

EXAMPLE 6

6α,9α-difluoro-11β-hydroxy-1,4-pregnadiene-3,20-dione (VIII) (Biological dehydrogenation)

Five 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of Septomyxa affinis A.T.C.C. 6737. The Erlenmeyer flasks are shaken at room temperature (about 26 to 28 degrees centigrade) for a period of three days. At the end of this period this 500-milliliter volume is used as an inoculum for ten liters of the same glucose-corn steep liquor medium which in addition contained five milliliters of an antifoam compound (a mixture of lard oil and octadecanol). The fermenter is placed into the water bath, adjusted to 28 degrees centigrade and the contents stirred (300 r.p.m.) and aerated (0.1 liter of air per minute to ten liters of beer). After twenty hours of incubation, when a good growth has been developed, one gram of 6α,9α-difluoro-11β-hydroxy-4-pregnene-3,20-dione (VI) in sixteen milliliters of dimethylformamide is added and the incubation carried out at the same temperature (28 degrees centigrade) and aeration for a period of 24 hours (final pH 8.3). The mycelium is filtered off and extracted with three 200-milliliter portions of acetone. The beer is extracted with three one-liter portions of methylene chloride and thereupon the extracts of the beer and acetone are combined, dried over anhydrous sodium sulfate, and chromatographed on a column containing 100 grams of Florisil (synthetic magnesium silicate). The column is eluted with increasing proportions of acetone in Skellysolve B hexanes (100-milliliters per fraction). Those crystalline materials obtained after evaporation of the solvent from the fractions obtained with twenty to 25 percent acetone in Skellysolve B hexanes are combined and recrystallized from acetone-Skellysolve B hexanes to give substantially pure crystals of 6α,9α-difluoro-11β-hydroxy-1,4-pregnadiene-3,20-dione.

Instead of Septomyxa, species of other genera such as Corynebacterium, Didymella, Calonectria, Alternaria, Colletotrichum, Cylindrocarpon, Ophiobolus, Fusarium, Listeria, Erysipelothrix, Mycobacterium, Trichothecium, Leptosphaeria, Cucurbitaria, Nocardia, and enzymes of fungi of the family Tuberculariaceae can be used to introduce a Δ¹-bond into 6α,9α-difluoro-11β-hydroxy-4-pregnene-3,20-dione.

Similarly, substitution of the corresponding 9α-chloro or 9α-bromo starting steroid in the above reaction produces 6α-fluoro-9α-chloro-11β-hydroxy-1,4-pregnadiene-3,20-dione and its 9α-bromo analogue, respectively.

EXAMPLE 7

6α,9α-difluoro-1,4-pregnadiene-3,11,20-trione (IX)

Substituting 6α,9α-difluoro-4-pregnene-3,11,20-trione (VII) for 6α,9α-difluoro-11β-hydroxy-4-pregnene-3,20-dione (VI) in the procedure of Example 6 is productive of 6α,9α-difluoro-1,4-pregnadiene-3,11,20-trione, a crystalline solid.

Likewise, the other microorganisms and enzymes listed in Example 6 can be used to introduce a Δ¹-bond into 6α,9α-difluoro-4-pregnene-3,11,20-trione (IX).

Similarly, substitution of the corresponding 9α-chloro or 9α-bromo starting steroid in the above reaction produces 6α-fluoro-9α-chloro-1,4-pregnadiene-3,11,20-trione and its 9α-bromo analogue, respectively.

EXAMPLE 8

6α,9α-difluoro-1,4-pregnadiene-3,11,20-trione (IX) from 6α,9α-difluoro-11β-hydroxy-1,4-pregnadiene-3,20-dione (VIII)

Substituting 6α,9α-difluoro-11β-hydroxy-1,4-pregnadiene-3,20-dione (VIII) for 6α,9α-difluoro-11β-hydroxy-4-pregnene-3,20-dione (VI) in the procedure of Example 5 produces 6α,9α-difluoro-1,4-pregnadiene-3,11,20-trione (XI).

Similarly, substitution of the corresponding 9α-chloro or 9α-bromo starting steroid in the reaction of Example 5 produces 6α-fluoro-9α-chloro-1,4-pregnadiene-3,11,20-trione and its 9α-bromo analogue, respectively.

EXAMPLE 9

6α,9α-difluoro-11β-hydroxy-1,4-pregnadiene-3,20-dione (VIII) (chemical dehydrogenation)

A mixture of 100 milligrams of 6α,9α-difluoro-11β-hydroxy-4-pregnene-3,20-dione (VI) dissolved in six milliliters of tertiary butyl alcohol and 0.55 milliliter of acetic acid is heated together with thirty milligrams of selenium dioxide to approximately 75 degrees centigrade under stirring for a period of about 24 hours. Thereafter another thirty-milligram portion of selenium dioxide is added and the mixture is heated to about 75 degrees centigrade under continuous stirring for a further period of 24 hours. The mixture is then cooled, filtered to remove the selenium dioxide and evaporated. The residue is recrystallized from acetone-Skellysolve B hexanes four times to give 6α,9α-difluoro-11β-hydroxy-1,4-pregnadiene-3,20-dione.

Similarly, substitution of the corresponding 9α-chloro or 9α-bromo starting steroid in the above reaction produces 6α-fluoro-9α-chloro-11β-hydroxy-1,4-pregnadiene-3,20-dione and its 9α-bromo analogue, respectively.

EXAMPLE 10

6α,9α-difluoro-1,4-pregnadiene-3,11,20-trione (IX) (chemical dehydrogenation)

Substituting 6α,9α-difluoro-4-pregnene-3,11,20-trione (VII) for 6α,9α-difluoro-11β-hydroxy-4-pregnene-3,20-dione (VI) in the procedure of Example 9 is productive of 6α,9α-difluoro-1,4-pregnadiene-3,11,20-trione.

Similarly, substitution of the corresponding 9α-chloro or 9α-bromo starting steroid in the procedure of Example 9 produces 6α-fluoro-9α-chloro-1,4-pregnadiene-3,11,20-trione and its 9α-bromo analogue, respectively.

EXAMPLE 11

*6α-fluoro-11β-hydroxy-1,4-pregnadiene-3,20-dione (XI)*
*(biological dehydrogenation)*

Substituting 6α - fluoro - 11β - hydroxy - 4 - pregnene-3,20-dione (II) for 6α,9α-difluoro-11β-hydroxy-4-pregnene-3,20-dione (VI) in the procedure of Example 6 produces 6α - fluoro - 11β - hydroxy - 1,4 - pregnadiene-3,20-dione (XI), a crystalline solid.

Similarly, the substitution of 6α-fluoro-11α-hydroxy-4-pregnene-3,20-dione in Example 11 is productive of 6α-fluoro-11α-hydroxy-1,4-pregnadiene-3,20-dione.

EXAMPLE 12

*6α - fluoro - 11β - hydroxy - 1,4 - pregnadiene - 3,20-dione (XI) (chemical dehydrogenation)*

Substituting 6α - fluoro - 11β-hydroxy-4-pregnene-3,20-dione (II) for 6α,9α-difluoro-11β-hydroxy-4-pregnene-3,20-dione (VI) in the procedure of Example 9 produces 6α-fluoro-11β-hydroxy-1,4-pregnadiene-3,20-dione (XI).

Similarly, the substitution of 6α-fluoro-11α-hydroxy-4-pregnene-3,20-dione in Example 12 is productive of 6α-fluoro-11α-hydroxy-1,4-pregnadiene-3,20-dione.

EXAMPLE 13

*6α - fluoro - 1,4,9(11) - pregnatriene - 3,20 - dione (XII)*

Substituting 6α - fluoro - 11β-hydroxy-1,4-pregnadiene-3,20-dione (XI), obtained according to the procedure of Examples 11 or 12, for 6α-fluoro-11β-hydroxy-4-pregnene-3,20-dione (II) in the procedure of Example 1 produces 6α-fluoro-1,4,9(11)-pregnatriene-3,20-dione (XII), a crystalline solid.

Similarly, the substitution of the corresponding 11α-hydroxy analogue of 6α-fluoro-11β-hydroxy-1,4-pregnadiene-3,20-dione is productive of 6α-fluoro-1,4,9(11)-pregnatriene-3,20-dione.

EXAMPLE 14

*6α - fluoro - 9α - bromo - 11β - hydroxy - 1,4 - pregnadiene-3,20-dione (XIII)*

Substituting 6α - fluoro - 1,4,9(11) - pregnatriene-3,20-dione (XII) for 6α-fluoro-4,9(11)-pregnadiene-3,20-dione (III) in the procedure of Example 2 produces 6α-fluoro-9α - bromo - 11β - hydroxy - 1,4-pregnadiene-3,20-dione (XIII).

Similarly, substitution of another N-haloamide or an N-haloimide such as N-iodosuccinimide or N-chlorosuccinimide for the N-bromoacetamide in the procedure of Example 2 is productive of the corresponding 9α-halo product.

EXAMPLE 15

*6α-fluoro-9,11β-oxido-1,4-pregnadiene-3,20-dione (XIV)*

Substituting 6α - fluoro - 9α - bromo - 11β - hydroxy-1,4-pregnadiene-3,20-dione (and the 9α-chloro and 9α-iodo analogue thereof, respectively) (XIII) for 6α-fluoro-9α-bromo-11β-hydroxy-4-pregnene-3,20-dione (IV) in the procedure of Example 3 produces 6α-fluoro-9,11β-oxido-1,4-pregnadiene-3,20-dione (XIV).

EXAMPLE 16

*6α,9α - difluoro - 11β - hydroxy - 1,4 - pregnadiene - 3,20-dione (VIII)*

Substituting 6α-fluoro-9,11β-oxido-1,4-pregnadiene-3,20-dione (XIV) for 6α-fluoro-9,11β-oxido-4-pregnene-3,20-dione (V) in the procedure of Example 4 produces 6α,9α-difluoro-11β-hydroxy-1,4-pregnadiene-3,20-dione (and the 9α-chloro and 9α-bromo analogue thereof, respectively) (VIII).

EXAMPLE 17

*The 6β-epimers*

Substituting 6β - fluoro - 11β-hydroxy-4-pregnene-3,20-dione for the starting material in Example 1 and following the procedures of Examples 1 through 16, there is produced as the final product of each example the corresponding 6β-steroid, for example, 6β-fluoro - 4,9(11) - pregnadiene-3,20-dione (Example 1), 6β - fluoro - 9α - bromo - 11β - hydroxy - 4 - pregnene-3,20-dione (Example 2), 6β - fluoro - 9,11β - oxido - 4-pregnene-3,20-dione (Example 3), 6β,9α-difluoro-11β-hydroxy-4-pregnene-3,20-dione (Example 4), 6β,9α-difluoro-4-pregnene-3,11,20-trione (Example 5), 6β,9α-difluoro-11β-hydroxy-1,4-pregnadiene-3,20-dione (Example 6, 9 or 16), 6β,9α-difluoro-1,4-pregnadiene-3,11,20-trione (Example 7, 8 or 10), 6β-fluoro-11β-hydroxy-1,4-pregnadiene-3,20-dione (Example 11 or 12), 6β-fluoro-1,4,9(11)-pregnatriene-3,20-dione (Example 13), 6β-fluoro-9α-bromo-11β-hydroxy-1,4-pregnadiene-3,20-dione (Example 14) and 6β-fluoro-9,11β-oxido-1,4-pregnadiene-3,20-dione (Example 15).

EXAMPLE 18

*Isomerization of the 6β-fluoro steroids to the corresponding 6α-fluoro steroids*

Illustratively, this reaction is carried out as follows:

A solution of one gram of 6β,9α-difluoro-11β-hydroxy-1,4-pregnadiene-3,20-dione in 100 milliliters of chloroform and 0.1 milliliter of alcohol is cooled to approximately minus ten degrees in an ice-salt bath and a stream of anhydrous hydrochloric acid is gently bubbled through the solution for about 2.5 hours whilst maintaining the temperature between approximately minus five and minus fifteen degrees centigrade. The solution is then washed with dilute sodium bicarbonate and water, dried over anhydrous sodium sulfate, and evaporated to dryness under reduced pressure. Crystallization of the residue from acetone-Skellysolve B hexanes yields 6α-9α-difluoro-11β-hydroxy-1,4-pregnadiene-3,20-dione (VIII).

In a similar manner, other 6β-fluoro steroids, for example, those named in Example 17, such as, for example, 6β - fluoro - 4,9(11) - pregnadiene - 3,20-dione, 6β-fluoro-9α - bromo - 11β - hydroxy - 4 - pregnene - 3,20 - dione, 6β - fluoro - 9,11β - oxido - 4 - pregnene - 3,20 - dione, 6β,9α - difluoro - 11β - hydroxy - 4 - pregnene - 3,20-dione, 6β,9α - difluoro - 4 - pregnene - 3,11,20 - trione, 6β,9α - difluoro - 1,4 - pregnadiene - 3,11,20 - trione, 6β-fluoro - 11β - hydroxy - 1,4 - pregnadiene - 3,20 - dione, 6β - fluoro - 1,4,9(11) - pregnatriene - 3,20 - dione, 6β-fluoro - 9α - bromo - 11β - hydroxy - 1,4 - pregnadiene-3,20 - dione and 6β - fluoro - 9,11β - oxido - 1,4 - pregnadiene -3,20-dione can be converted to their corresponding 6α-analogues.

This application is a continuation-in-part of application Serial No. 699,503, filed November 29, 1957.

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:

1. A 6-fluoro-11-oxygenated compound of the following formula:

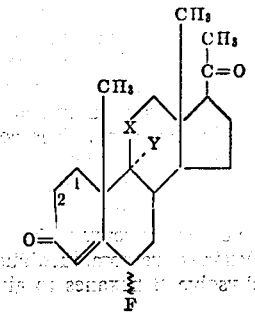

wherein the 1,2-carbon atom linkage is selected from the linkages consisting of single and double bond linkages, X is selected from the group consisting of the carbonyl radical and the hydroxymethylene radical and Y is a halogen having an atomic weight of from nineteen to eighty, inclusive.

2. 6,9α - difluoro - 11β - hydroxy - 4 - pregnene - 3,20-dione.
3. 6α,9α-difluoro-11β-hydroxy-4-pregnene-3,20-dione.
4. 6β,9α-difluoro-11β-hydroxy-4-pregnene-3,20-dione.
5. 6,9α-difluoro-4-pregnene-3,11,20-trione.
6. 6α,9α-difluoro-4-pregnene-3,11,20-trione.
7. 6β,9α-difluoro-4-pregnene-3,11,20-trione.
8. 6,9α - difluoro - 11β - hydroxy - 1,4 - pregnadiene-3,20-dione.
9. 6α,9α - difluoro - 11β - hydroxy - 1,4 - pregnadiene-3,20-dione.
10. 6β,9α -difluoro - 11β - hydroxy - 1,4 - pregnadiene-3,20-dione.
11. 6,9α-difluoro-1,4-pregnadiene-3,11,20-trione.
12. 6α,9α-difluoro-1,4-pregnadiene-3,11,20-trione.
13. 6β,9α-difluoro-1,4-pregnadiene-3,11,20-trione.
14. 6 - fluoro - 9α - bromo - 11β - hydroxy - 4 - pregnene-3,20-dione.
15. 6α - fluoro - 9α - bromo - 11β - hydroxy - 4 - pregnene-3,20-dione.
16. 6β - fluoro - 9α - bromo - 11β - hydroxy - 4 - pregnene-3,20-dione.
17. 6 - fluoro - 9α - bromo - 11β - hydroxy - 1,4 - pregnadiene-3,20-dione.
18. 6α - fluoro - 9α - bromo - 11β - hydroxy - 1,4-pregnadiene-3,20-dione.
19. 6β - fluoro - 9α - bromo - 11β - hydroxy - 1,4 - pregnadiene-3,20-dione.
20. A 6-fluoro-9,11β-oxido compound of the following formula:

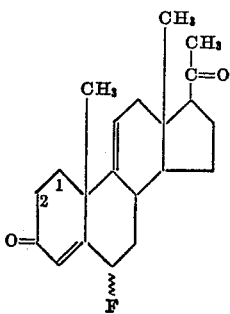

wherein the 1,2-carbon atom linkage is selected from the linkages consisting of single and double bond linkages.
21. 6-fluoro-9,11β-oxido-4-pregnene-3,20-dione.
22. 6-fluoro-9,11β-oxido-1,4-pregnadiene-3,20-dione.
23. A 6-fluoro-9(11)-dehydro compound of the following formula:

wherein the 1,2-carbon atom linkage is selected from the linkages consisting of single and double bond linkages.
24. 6-fluoro-4,9(11)-pregnadiene-3,20-dione.
25. 6-fluoro-1,4,9(11)-pregnatriene-3,20-dione.

No references cited.